(12) United States Patent
Wolf, II

(10) Patent No.: US 8,056,805 B2
(45) Date of Patent: Nov. 15, 2011

(54) PDA COMPATIBLE TEXT SCANNER

(76) Inventor: Erich W. Wolf, II, Lake Charles, LA (US)

( * ) Notice: Subject to any disclaimer, the term of this patent is extended or adjusted under 35 U.S.C. 154(b) by 841 days.

(21) Appl. No.: 12/070,803

(22) Filed: Feb. 21, 2008

(65) Prior Publication Data

US 2008/0237347 A1    Oct. 2, 2008

Related U.S. Application Data

(63) Continuation-in-part of application No. 11/156,814, filed on Jun. 17, 2005, now Pat. No. 7,364,077.

(51) Int. Cl.
*G06K 7/10* (2006.01)

(52) U.S. Cl. .......................... 235/454; 358/473
(58) Field of Classification Search .................. 235/454; 358/473, 474

See application file for complete search history.

(56) References Cited

U.S. PATENT DOCUMENTS

| | | | |
|---|---|---|---|
| 5,585,615 A * | 12/1996 | Iwanami et al. | 235/462.06 |
| 5,812,870 A | 9/1998 | Kikinis et al. | |
| 7,593,605 B2 * | 9/2009 | King et al. | 382/313 |
| 2002/0169509 A1 | 11/2002 | Huang et al. | |
| 2002/0196477 A1 | 12/2002 | Chen | |
| 2003/0151780 A1 | 8/2003 | Tsai | |
| 2004/0059846 A1 | 3/2004 | Liu et al. | |
| 2004/0093444 A1 | 5/2004 | Liao | |
| 2004/0201871 A1 | 10/2004 | Risheq | |
| 2005/0111056 A1 * | 5/2005 | Chiba et al. | 358/474 |

* cited by examiner

*Primary Examiner* — Daniel Hess
(74) *Attorney, Agent, or Firm* — Schultz & Associates, P.C.

(57) ABSTRACT

An optical text scanning device compatible with a small handheld computer such as a personal digital assistant (PDA). The scanning device allows for a clear view of the text that is scanned simultaneous to the scanning process so that the operator can continuously align the device to the text. The scanned images of the text are converted in real-time to standard byte or word characters for subsequent display on the computer's viewing screen. The operator can quickly verify the accuracy of the conversion by comparing the displayed character with the actual character of text on the surface that is being scanned. Scanned text characters are stored in standard digital text files for ease of manipulation.

29 Claims, 7 Drawing Sheets

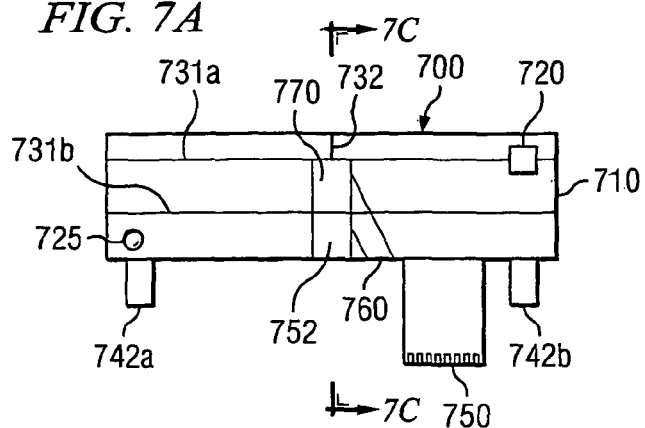
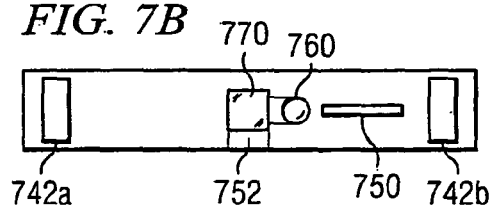
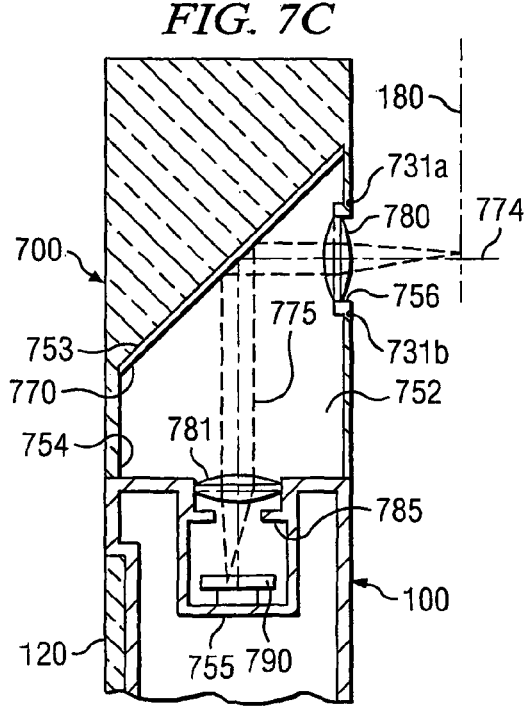
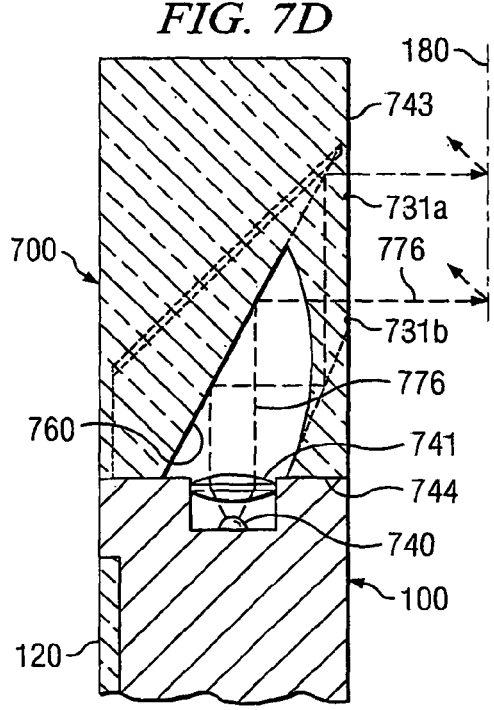

PDA COMPATIBLE TEXT SCANNER

CROSS-REFERENCE TO RELATED APPLICATIONS

This application is a continuation-in-part application claiming priority to U.S. patent application Ser. No. 11/156,814 filed Jun. 17, 2005 now U.S. Pat. No. 7,364,077.

TECHNICAL FIELD OF THE INVENTION

The invention relates to an optical text scanning device integrated with a small handheld computer such as a personal digital assistant (PDA). In particular, it teaches hardware and software concepts that allow simultaneous optical viewing of the text as it is scanned and real-time conversion of the scanned images to a standard text character stream for subsequent display on a viewing screen.

BACKGROUND OF THE INVENTION

The small handheld computer or personal digital assistant (PDA) has become a popular tool in the business world and more recently in personal communications. These devices have incorporated wireless functions, cellular phone functions, personal audio, camera and video functions so that the market for such devices have expanded well beyond the business person to the individual. The modern PDA operates as a multifunction device that many individuals carry with them at all times.

The PDA performs as a technology platform for the development of many new value-added portable devices that can be integrated as hardware or software add-ons to the PDA or linked through wireless functions. There is an ever growing market for PDA add-ons as the penetration of users continues to expand from business applications to personal applications.

A relevant class of PDA add-on devices has been developed to improve the means of getting information into and out of the device. Cameras based PDA add-ons are particularly effective because a large volume of data, typically 1 Megabyte to 10 Megabytes, can be collected optically and electronically in a sub-second period of time. Closely related to optical imaging is the field of optical scanning of documents. With the addition of an optical scanner to a PDA, especially a PDA that has wireless or cellular capabilities, one can perform such tasks as, for example, portable faxing of documents from the field, or, the scanning and uploading of a serial number from the field so that useful product information could be rapidly and accurately downloaded to a technician during a repair process.

With respect to the prior art, there are examples of optical scanning devices that could be used in conjunction with a PDA. One example is an optical wand. Optical wands are currently commercially available and may communicate with PDAs via an external cable, but these are not seamlessly integrated and require an extra hand-held device. For example, Faulkerson, U.S. Pat. No. 4,804,949 discloses a scanning device in combination with a computer mouse connected via an umbilical cord to an external computer for OCR processing and text display. Faulkerson does not teach the on-board integration of optical scanning functions directly into a PDA.

Liao, U.S. Patent application No. 2004/0093444 A1 shows a PDA converted into an optical scanning device by adding an optical scanner assembly onto the back surface. Liao also discloses the application of scanning business card data into a PDA as bit-mapped images. Liao does not include a mechanism for illuminating the object to be scanned nor does he provide for simultaneous viewing of the object during the scan nor does he provide a mechanism for real-time image conversion to digital characters.

A similar disclosure is read in Huang, U.S. Patent Application No. 2002/0169509 A1 in which the author discloses a handheld device, such as a PDA, capable of optical scanning. Huang discusses a feeder scanner design in which the PDA is situated inside a base housing and the documents are fed through a scanner channel via a set of rollers. Huang's design limits the scanned document sizes to those that can fit through the housing and otherwise suffers from similar limitations as Liao.

In Tsai, U.S. Patent Application No. 2003/0151780, a scanning device is disclosed which includes a chassis for housing a PDA. Tsai also discloses an optical sensing assembly engaged with the transmission assembly so as to transfer the speed signal of the movement of the scanning device. Tsai's invention, while not limited by the document size, suffers from some of the same general limitations as the other designs, namely that the viewing of the document is limited to a bit-mapped image of the scanned input and that there is no immediate conversion to a standard digital character format. Real-time scanning of text directly into standard byte or word character format would realize a significant improvement in portability over the prior art, since text files composed of standard digital characters have much smaller file sizes compared to image file formats.

SUMMARY OF THE INVENTION

The current invention is a PDA compatible text scanner with certain novel features. The text scanner is incorporated into the PDA via physical, electronic, optical and software functions and can be used in a portable fashion as the combined unit is battery powered and handheld in size and weight. The text scanner can be a permanent fixture of the PDA or easily removable. The invention need not be limited to using a PDA platform: any type of portable handheld computer could be substituted for the PDA, such as a handheld calculator, portable audio player or cell phone.

An objective of the invention is to allow text to be scanned easily from a variety of sources. The scanning function is not constrained to the size or type of document. For example, but not by way of limitation, the document may be the size of a business card or the document may be part or all of the text in a large architectural scale blueprint. The invention does not constrain the geometry of the scanned text to a flat surface but may be employed to scan text on curved surfaces such as medicine containers or other product containers.

A feature of the preferred embodiment of this invention is that the text scanner assembly is constructed of optically transparent material and designed in such a way that the user can clearly view the text as it is scanned. The invention also incorporates a set of horizontal and vertical alignment marks that combine functionally with the clear view of the scanned text allowing for ease of alignment and scanning accuracy. The invention further discloses an illumination light guide that not only eases the viewing of text, but also increases the signal to noise level of the electronic image capture and subsequent character recognition process. Another feature of the invention is that it converts the scanned image of the text characters to standard byte or word digital character format in real time, for example to ASCII format, storing the digital character in memory and displaying the digital character on the PDA viewing screen. The invention incorporates the use of optical character recognition (OCR) processes in conjunction with the scan process.

The PDA compatible text scanner in the present invention utilizes known electronic interfaces found on PDAs such as a module expansion slot or memory expansion slot (e.g. SecureDigital, MMC, compact flash, etc.). Modern PDAs may incorporate a built-in camera and light source. The preferred embodiment of the present invention teaches a means of using camera devices that are built-in to the PDA to accomplish the image acquisition. However, built-in PDA cameras are not a general requirement of the present invention.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 7(A-D) are drawings of a third embodiment of the present invention showing views: (A) top view, (B) side view, (C) first cross-section view of an optical reader assembly attached to a PDA indicating the optical cavity and optical components, (D) second cross-section view of an optical reader assembly attached to a PDA indicating the illuminator light guide.

DETAILED DESCRIPTION OF THE INVENTION

Figure 1:
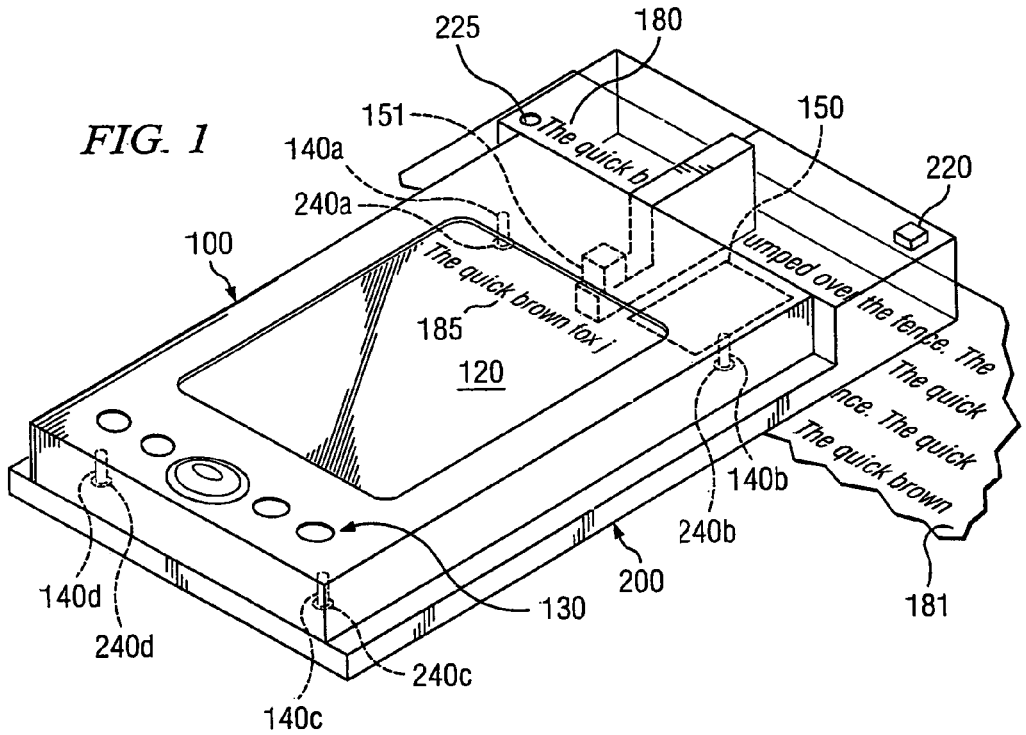
FIG. 1 is a perspective drawing of one embodiment of the present invention.

In FIG. 1 is shown a front perspective view of the preferred embodiment of a PDA text scanner device comprised of an optical reader assembly 200 mechanically attached to a rectangular shaped PDA unit 100 by four screws 140a, 140b, 140c and 140d secured from the rear via holes 240a, 240b, 240c and 240d. The top surface of reader assembly 200 is approximately co-planar with and faces the same direction as the front surface of the PDA unit 100. Text print, printed figures or written objects form an optical target 180 that lies on a surface 181 that is beneath the bottom surface of optical reader assembly 200. The surface 181 is located ideally from 0 to 2 cm below the bottom surface of the optical reader assembly. The top and bottom surfaces of optical reader assembly 200 are approximately parallel. The optical reader assembly is further shown in FIG. 2.

Those familiar with PDA devices will realize that the mechanical means by which the optical reader assembly attaches to the PDA unit is dependent upon the specific geometry of the PDA unit and that the invention may easily encompass other means of attachment. For example, in other embodiments it may be beneficial to include a spring-loaded ball-and-detent attachment mechanism (not shown) or a molded plastic form that releasably connects to the body of the PDA to allow for rapid and easy removal of the optical reader assembly when it is not in use or where access to certain features of the PDA (such as the camera) is required.

PDA unit 100 has a viewing screen 120 and control buttons 130 situated on the front surface just below the viewing screen 120 and a built-in camera unit 151 on the rear surface. In use, scanned characters 185 appear on the PDA viewing screen 120 as the optical target 180 is scanned into the device. An acquire button 220 is mounted on the top surface of the optical reader assembly as shown along with an optical reader indicator LED 225, also mounted on the optical reader assembly's top surface.

Referring to FIG. 2, the optical reader assembly 200 includes an optical block 210 that is transparent and made of clear acrylic material 210 in the preferred embodiment. Other materials such as glass or crystal can be used in alternated embodiments. Colored transparent materials may also be used for special applications of the invention (such as in a low light embodiment or for aesthetic appeal such as in a children's toy).

The electrical connection between the optical reader assembly 200 and the PDA unit 100 is accomplished using PDA electrical interface 150. Acquire button 220 and optical reader indicator LED 225 are connected by electrical traces (not shown) to the electrical connector 250 which mates with PDA electrical interface 150. In other embodiments, the optical reader assembly 200 may incorporate the use of driver electronics between the PDA electrical interface and said components to accomplish electronic connections.

Figure 2A:
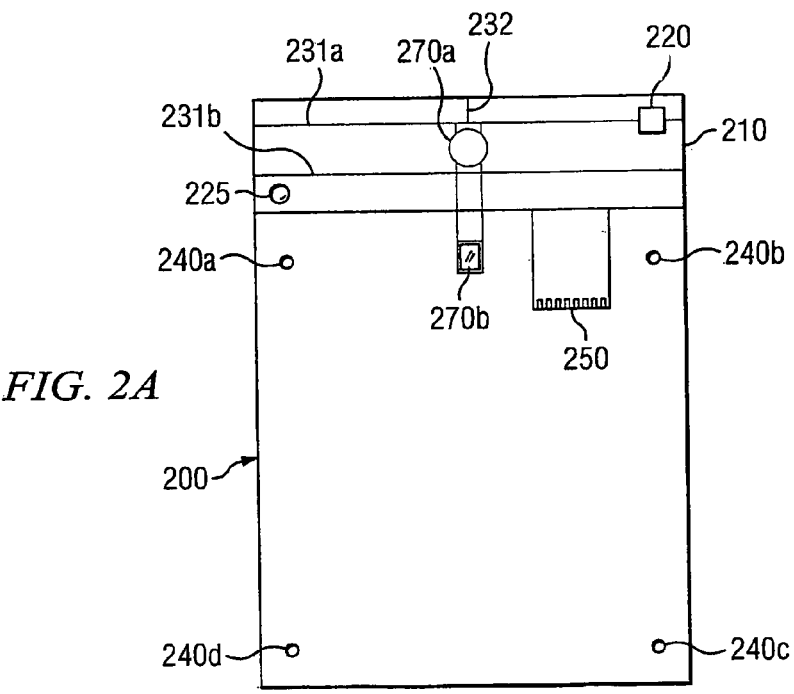
FIG. 2 (A, B) show two views of a preferred embodiment of the present invention showing (A) the top view, and (B) the bottom view.
Figure 2B:
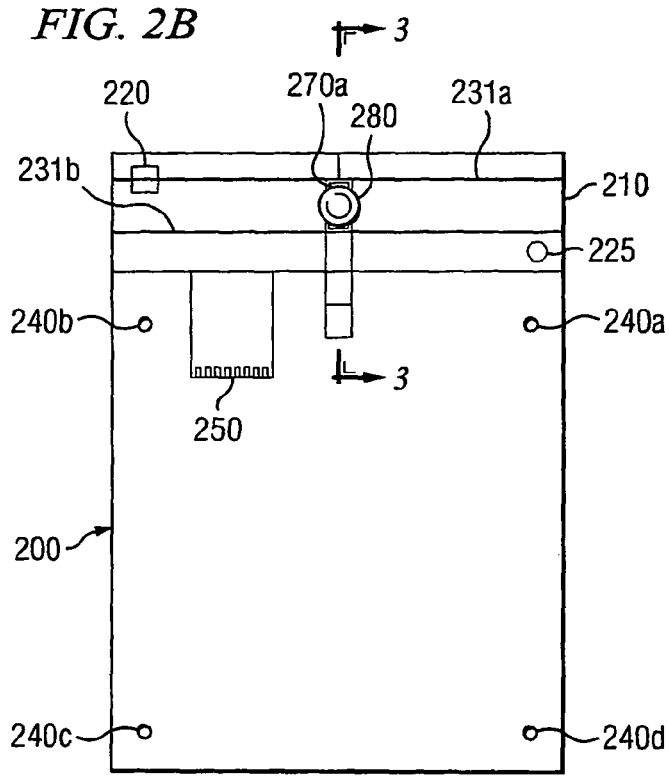

Continuing with FIGS. 2A and 2B, optical reader assembly 200 incorporates alignment marks. In particular, there are a set of horizontal alignment marks 231a and 231b inscribed on the bottom surface of optical reader assembly 200 and a vertical alignment mark 232 inscribed on the top surface of the optical reader assembly 200.

Mirrors 270a and 270b and Lens 280 guide light from the bottom of the optical reader assembly 200 to the back of the PDA unit 100. Further details of the optical components are disclosed in FIG. 3.

Figure 3:
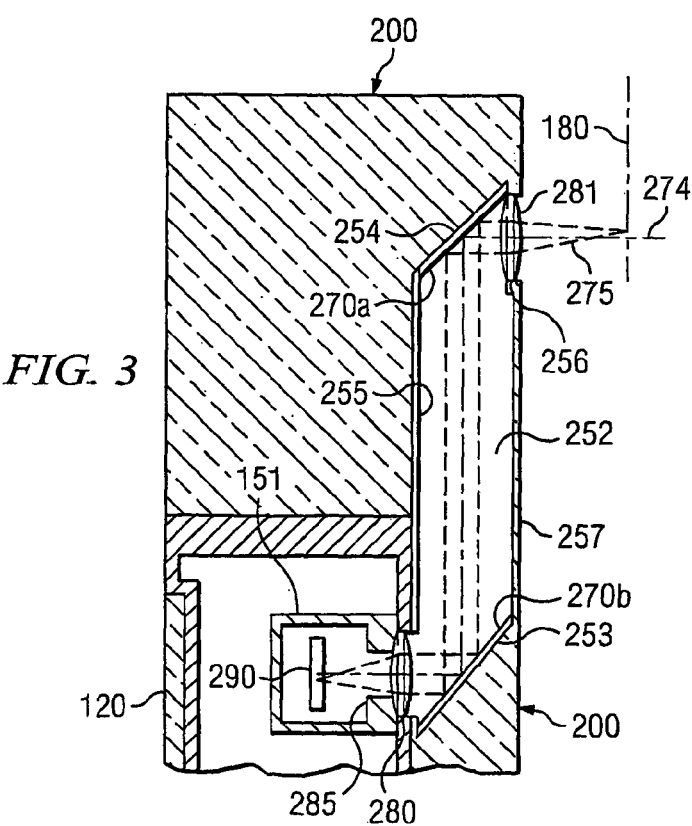
FIG. 3 is a partial cross-sectional view of a preferred embodiment of the present invention showing the detail of a camera unit and optical assembly.

As shown in FIG. 3, a rhomboid shape optical cavity 252 is included in the optical reader. The cavity forms a void in optical block 210 and is defined by parallel surfaces 253 and 254, inner surface 255, outer surface 257 and lens mount 256. PDA camera unit 151 is typically recessed into PDA unit 100 behind the PDA viewing screen 120. Mirror 270a is affixed with adhesive to surface 254 of the cavity with its reflective surface facing optical target 180 at an angle of about 45 degrees from the optical axis 274. Optical axis 274 is the axis defined by a line on which the centers of the optical components lie and is approximately perpendicular to the back of the PDA as it exits optical reader assembly 200. Mirror 270b is adhered to surface 253 of the cavity with its reflective surface facing PDA camera unit 151 at an angle of about 45 degrees from optical axis 274. PDA camera unit 151 incorporates a first optical lens 280, aperture stop 285 and optical image detector 290 as shown and it is built-in to the PDA unit 100. The first optical lens 280 is positioned such that an optical image of optical target 180 is formed on the surface of optical image detector 290. Aperture stop 285 serves to define the field of view and depth of field of the camera unit. In the preferred embodiment, optical reader assembly 200 incorporates a second optical lens 281 which is centered on optical axis 274 and located just inside the bottom surface of optical reader assembly 200 attached to lens mount 256. Mirrors 270a and 270b are fixed in such a way as to define optical ray paths 275 from the surface of optical detector 290 to mirrors 270 to optical target 180 thereby allowing optical target 180 to be imaged on optical detector 290.

In the preferred embodiment the lenses are made of glass or plastic substrate and assembled as separate elements. In an alternate embodiment, at least one of the lenses may be molded as a part of the block 210. In other embodiments, at least one of the optical lens functions may be combined with the mirror function by using a curved mirror surface; the lens positions and overall magnification may vary as long as the object is imaged onto the detector surface. The equations for determining lens position relative to the object and detector are well known in the art.

In the preferred embodiment, the mirrors are front silvered flat glass substrates inserted into optical reader assembly 200 and fixed in place by an adhesive. There are other means of accomplishing the function of the mirrors such as using multiple silvered substrates, silvering one or more surfaces of the optical reader assembly 200 or inserting one or more prisms into the optical cavity 252.

In the preferred embodiment, optical image detector 290 is a charge-coupled device (CCD) having approximately 500 by 500 pixels and lateral dimensions of one-half inch or less. The invention comprehends that other technology may be deployed in the PDA to accomplish the optical to electronic conversion of the image—for example, a CMOS imaging device may be deployed in other embodiments. In the preferred embodiment, camera unit 151 is integral to the PDA unit 100 and may accomplish functions known in the art such as autofocus and zoom in conjunction with software resident on the host PDA. For example, the autofocus function will allow the optical target 180 to be placed at different distances from the scanning unit. The resident software may also operate the integrated camera in a "black and white" mode whereby the color information is discarded, thereby creating further efficiencies in the scanning process. Within the scope of the present invention, it is envisioned that the user can quickly remove the optical reader assembly so that optical images of text or other material could be taken in photographic mode and processed accordingly.

Figure 4A:
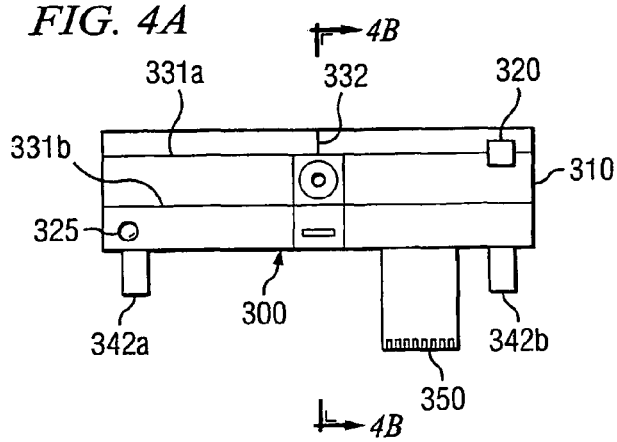
FIG. 4 (A-C) are drawings of a second embodiment of the present invention showing views: (A) a top view, (B) a cross-sectional view AA showing the optical components, and (C) a bottom view.

In an alternate embodiment shown in FIG. 4A, optical reader assembly 300 is shown. The optical reader assembly 300 has optical body 310 made of clear acrylic and has two mounting tabs 342a and 342b for mounting the device on the PDA unit. The mounting is accomplished by inserting the mounting tabs into matching recesses into the PDA unit 100 and utilizing set screws to hold the mounting tabs 342 in place. Those familiar with PDA devices will realize that the mechanical means by which the optical reader assembly attaches to the PDA unit is dependent upon the specific geometry of the PDA unit and that the invention may easily encompass other means of attachment. For example, in other embodiments it may be beneficial to include a spring-loaded ball-and-detent attachment mechanism or a molded plastic form that snaps to the body of the PDA to allow for rapid and easy removal of the optical reader assembly when it is not in use.

Optical body 310 includes an acquire button 320, indicator LED 325 attached to the top surface and an electrical connector 350 that mates with PDA electrical interface 150 to connect said devices with PDA unit 100.

Horizontal alignment marks 331a, 331b and vertical alignment mark 332 are inscribed into the main body 310: the horizontal and vertical marks indicate the position of optical target 180 placement relative to the main body 310.

Figure 4B:
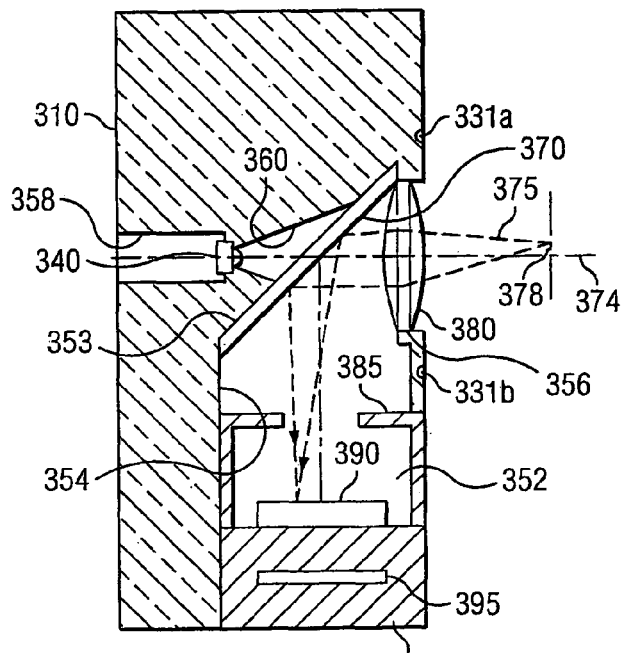
Figure 4C:
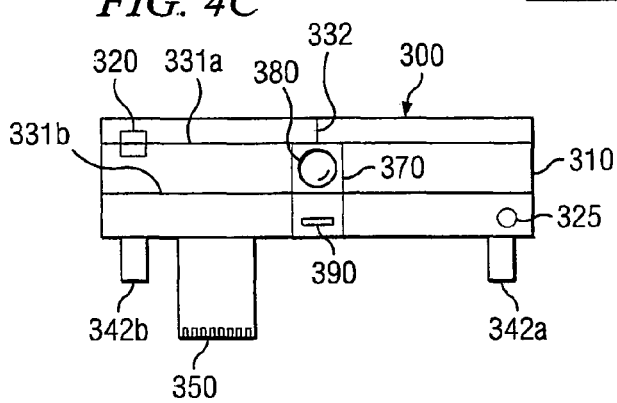

An optical cavity 352 is included in the optical body generally centered at the horizontal midpoint marked by vertical alignment mark 332 as shown in FIG. 4A and FIG. 4C. Referring to FIG. 4B, optical cavity 352 is defined by reflector support surface 353, inner surface 354, camera housing 355, lens mount 356, illuminator light guide 360 and illuminator housing 358. The reflector support surface, inner surface, camera housing, illuminator light guide and illuminator housing form a void in the main body and comprise a housing for the optical components of the system. Mirror 370, in the preferred embodiment, is a front silvered partially reflecting mirror of about 50% reflectivity attached by its non-reflective surface to reflector support surface 353 using an adhesive. The reflective surface of mirror 370 is facing optical target 378 at an angle of about 45 degrees from the optical axis 374. Optical axis 374 is a line through the centers of the optical components and is approximately perpendicular to the bottom face of the PDA unit as it exits optical reader assembly 300.

In other embodiments, mirror 370 may be replaced by a back silvered mirror or a triangular prism positioned to reflect light from optical target 378 into the other optical components of the system. In other embodiments, where the illuminator light guide is not directly behind the mirror surface 353, the function of the mirror 370 can also be performed by a reflective coating applied directly to reflector surface 353.

Optical reader assembly 300 incorporates an optical lens 380 fixed to lens mount 356, aperture stop 385 which is fixed to and supported by camera housing 355, and optical image detector 390 affixed to camera housing 355. The optical lens 380 is centered on the optical axis 374 and located just inside the bottom surface of optical reader assembly 300; it is positioned approximately mid-way between the optical target 378 and the optical detector 390 at about twice its focal distance from optical target 378 so that an image of optical target 378 is formed on the surface of optical detector 390 with approximately unit magnification. Aperture stop 385 serves to define the field of view and depth of field. Optical ray paths 375 trace light from optical target 378 to lens 380 to mirror 370 to optical detector 390, thereby allowing optical target 378 to be imaged by optical detector 390. Optical lens 380 may incorporate an anti-reflection coating to reduce stray light reflections.

In the present embodiment the lens is made of glass or plastic substrate and assembled as a distinct element. In another embodiment, the lens may be molded as a part of optical block 310. In other embodiments, the optical lens function may be combined with the mirror function by using a curved mirror surface; the lens position and overall magnification may vary as long as the object is imaged onto the detector surface. The equations for determining lens position relative to the object and detector are well known in the art.

Optical reader assembly 300 has an illuminator light guide 360 which is a tapered hole situated just behind partially silvered mirror 370. Illuminator housing 358 is a hole connecting to illuminator light guide 360 both of which are generally centered on the optical axis 374 as projected through the mirror 370. Light source 340 is fixed inside illuminator housing 358 so that it protrudes into the illuminator light guide 360 at approximately the rear focal plane of lens 380. Light from light source 340 propagates through the partially silvered mirror 370, through the lens 380 and exits optical reader assembly 300 approximately collimated to illuminate the optical target 378. Light source 340 is typically a light emitting diode (LED) chosen to match the spectral response of the optical detector 390, but other sources of illumination are possible within the scope of the invention. Light source 340 is powered by current received from PDA unit 100 via electrical interface 150 and flexible wires (not shown) which interconnect to electrical connector 350. Electrical connector 350 provides a mating interface with PDA electrical interface 150.

In alternate embodiments of the invention the illumination guide is accomplished by the insertion of one or more optical waveguides such as a void in the optical block or optical fibers. The illuminator light spectrum and optical waveguide may be chosen to match the wavelength peak sensitivity of the optical detector, such as in the infrared range so as to illuminate a large area of text in the vicinity of the optical reader. The illumination light spectrum may also be chosen in the visible spectrum to enhance the user's ability to see the material to be scanned, especially in the absence of ambient light. In such embodiments where an optical waveguide is deployed, the partially silvered mirror may be replaced by a fully reflecting mirror or prism.

Optical image detector 390 is a charge-coupled device (CCD) having approximately 500 by 500 pixels and lateral dimensions of one-half inch or less. Optical detector 390 can be model TC237 680×500 pixel monochrome CCD made by Texas Instruments of Dallas, Tex. The invention comprehends that other technology may be used to accomplish the optical to electronic conversion of the image—for example, a CMOS imaging device may be deployed in other embodiments. The camera may accomplish functions known in the art such as autofocus and zoom in conjunction with software resident on the host PDA. For example, the autofocus function will allow the optical target 378 to be placed at different distances from the optical reader assembly. The resident software may also operate the integrated camera in a "black and white" mode whereby the color information is discarded, thereby creating further efficiencies in the scanning process. Within the scope of the present invention, it is envisioned that the user can easily remove the optical reader assembly so that optical images of text or other material could be taken in photographic mode and processed accordingly.

Optical detector 390 is physically connected to control circuit board 395. Control circuit board 395 provides on-board memory, clocking, electrical buffering and computer interface functions. Control circuit board 395 is electronically connected to the PDA unit 100 via flexible cabling (not shown) which interconnects to electrical connector 350 which mates with PDA electrical interface 150.

Optical reader assembly 300 may incorporate the use of other driver electronics (not shown) between the PDA electrical interface 150, light source 340, acquire button 320 or indicator LED 325 to accomplish electronic connection.

In a third embodiment shown in FIGS. 7A-7D, optical reader assembly 700 is shown. The optical reader assembly 700 includes optical body 710 made of clear acrylic and has two mounting tabs 742a and 742b for mounting the device on PDA unit. The mounting is accomplished by inserting the mounting tabs into matching recesses into PDA unit 100 and utilizing set screws to hold mounting tabs 742a and 742b in place. Those familiar with PDA devices will realize that the mechanical means by which the optical reader assembly attaches to the PDA unit is dependent upon the specific geometry of the PDA unit and that the invention may easily encompass other means of attachment. For example, in other embodiments it may be beneficial to include a spring-loaded ball-and-detent attachment mechanism or a molded plastic form that snaps to the body of the PDA to allow for rapid and easy removal of the optical reader assembly when it is not in use.

Optical reader assembly 700 includes an optical body made of clear acrylic material 710, an acquire button 720, indicator LED 725 attached to the top surface and an electrical connector 750 that mates with PDA electrical interface 150 to connect said devices with the PDA unit 100.

Horizontal alignment marks 731a, 731b and vertical alignment mark 732 are inscribed into the optical body 710: the horizontal and vertical marks indicate the position of optical target 180 placement relative to the optical body 710.

Optical cavity 752 is included in optical body 710 and centered at generally the horizontal midpoint marked by vertical alignment mark 732 as shown in FIG. 7A. Referring to FIG. 7C, the optical cavity 752 is defined by reflector support surface 753, inner surface 754 and lens mount 756. The reflector support surface and inner surface form a void in the main body and comprise a housing 755 for the optical components of the system. Mirror 770, in the present embodiment, is a front silvered mirror of high reflectivity attached by its non-reflective surface to reflector support surface 753. The reflective surface of mirror 770 faces optical target 180 at an angle of about 45 degrees from the optical axis 774 which is a line generally through the centers of the optical components and is approximately perpendicular to the bottom face of the PDA unit as it exits the optical reader assembly 700.

In other embodiments, mirror 770 may be replaced by a back silvered mirror or a triangular prism positioned to reflect light from the optical target 180 into the other optical components of the system. In other embodiments, the function of the mirror 770 can also be performed by a reflective coating applied directly to reflector surface 753.

Optical reader assembly 700 incorporates a primary optical lens 780 fixed to lens mount 756. The primary optical lens 780 is centered on the optical axis 774 and located just inside the bottom surface of optical reader assembly 700.

Continuing with FIG. 7C and FIG. 1, PDA camera unit 151 faces the vertical and is recessed into the PDA unit 100 at the upper end of the PDA. PDA camera unit 151 incorporates a camera lens 781, aperture stop 785 and optical image detector 790 mounted to support 755 as shown. Primary optical lens 780 is positioned approximately its focal distance away from optical target 180 such that optical rays 775 are rendered nearly parallel as they enter PDA camera unit 151 resulting in an optical image of optical target 180 on the surface of optical image detector 790. The aperture stop 785 serves to define the field of view and depth of field of the camera unit.

In the third embodiment, lens 180 is made of glass or plastic substrate and assembled as a distinct element. In an alternate embodiment, the lens may be molded as a part of optical block 710. In other embodiments, the optical lens function may be combined with the mirror function by using a curved mirror surface; the lens position and overall magnification may vary as long as the object is imaged onto the detector surface. The equations for determining lens position relative to the object and detector are well known in the art.

Also in the third embodiment, the mirror is a front silvered flat glass substrate inserted into optical reader assembly 700 and fixed in place by an adhesive. There are other means of accomplishing the function of the mirrors such as using multiple silvered substrates, silvering one or more surfaces of optical reader assembly 700 or inserting one or more prisms into optical cavity 752.

In the third embodiment, optical image detector 790 is a charge-coupled device (CCD) having approximately 500 by 500 pixels and lateral dimensions of one-half inch or less. The invention comprehends that other technology may be used to accomplish the optical to electronic conversion of the image—for example, a CMOS imaging device may be deployed. The camera unit 151 is integral to the PDA unit 100 and may accomplish functions known in the art such as autofocus and zoom in conjunction with software resident on the host PDA. For example, the autofocus function will allow the optical target 180 to be placed at different distances from the scanning unit. The resident software may also allow the integrated camera to operate in a "black and white" mode whereby the color information is discarded, thereby creating further efficiencies in the scanning process. Within the scope of the present invention, it is envisioned that the user can easily remove the optical reader assembly so that optical images of text or other material could be taken in photographic mode and processed accordingly.

As shown in FIG. 7D, optical reader assembly 700 has an illuminator light guide 760 which is a hole in optical block 710 from the interface surface 744 to the bottom surface 743. FIGS. 7A and 7B show top and side views of the illuminator light guide 760. A light source 740 with it collimating lens 741 is a part of the PDA unit 100. The position and angle of the illuminator light guide 760 is made to match the positions of the collimating lens 741 and optical target position 180. Light from light source 740 propagates through the illuminator light guide 760 along optical rays 776 and exits the optical reader assembly 700 to illuminate the optical target 180.

Other embodiments of the invention are conceived in which the illumination light guide is accomplished using different shaped voids than the present embodiment or optical fibers inserted into the optical block 710. The illuminator light spectrum and optical waveguide may also be chosen so as to illuminate a large area of text in the vicinity of the optical reader to enhance the user's ability to see the material to be scanned, especially in the absence of ambient light. The illumination light spectrum may also be chosen to match the peak sensitivity of the optical detector.

In a fourth embodiment shown in FIG. 8, optical reader assembly 800 is shown. The optical reader assembly 800 is made of clear acrylic and has two mounting tabs 842*a* and 842*b* for mounting the device on PDA unit. The mounting is accomplished by inserting the mounting tabs into matching recesses into PDA unit 100 and utilizing set screws to hold mounting tabs 842 in place. Those familiar with PDA devices will realize that the mechanical means by which the optical reader assembly attaches to the PDA unit is dependent upon the specific geometry of the PDA unit and that the invention may easily encompass other means of attachment. For example, in other embodiments it may be beneficial to include a spring-loaded ball-and-detent attachment mechanism or a molded plastic form that snaps to the body of the PDA to allow for rapid and easy removal of the optical reader assembly when it is not in use.

Optical reader assembly 800 includes an optical body made of clear acrylic material 810, an acquire button 820, indicator LED 825 attached to the top surface and an electrical connector 850 that mates with PDA electrical interface 151 to connect said devices with PDA unit 100.

Horizontal alignment marks 831*a*, 831*b* and vertical alignment mark 832 are inscribed into optical body 810: the horizontal and vertical marks indicate the position of optical target 180 placement relative to the optical body 810.

Figure 8A:
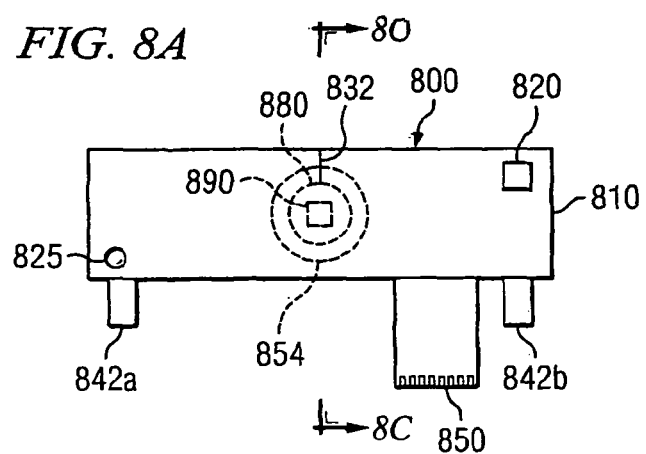
FIG. 8(A-C) are drawings of a fourth embodiment of the present invention showing views: (A) top view, (B) bottom view, (C) cross-section view of an optical reader assembly attached to a PDA indicating the optical cavity and optical components.
Figure 8B:
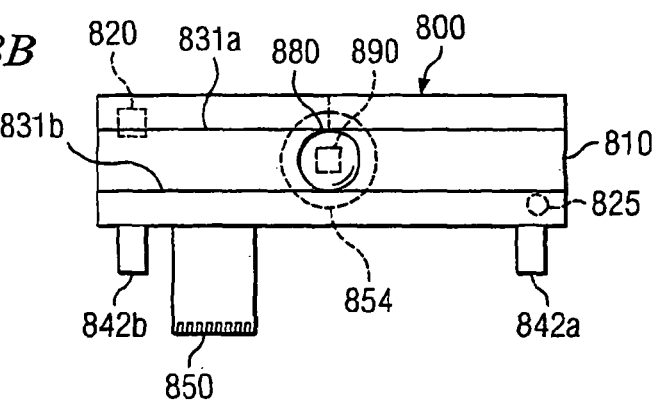
Figure 8C:
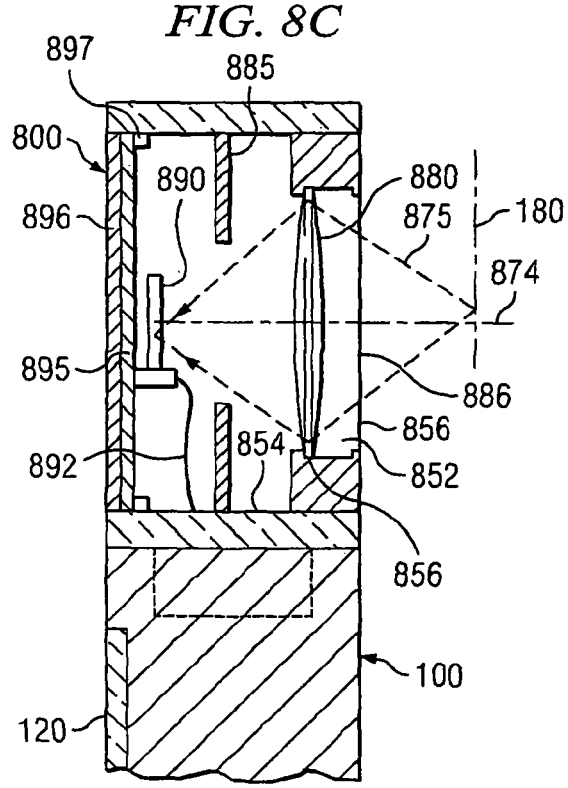

A cylindrical optical cavity 852 is included in optical body 810 and generally centered at the horizontal midpoint marked by vertical alignment mark 832 as shown in FIG. 8A and FIG. 8B. Referring to FIG. 8C, optical cavity 852 includes a threaded inner surface 854 and bottom opening 886 forming a void in the optical body and comprising a housing for the optical components of the system. The optical components are mounted and threaded into the cylindrical optical cavity 852 in inner surface 854 and held in place by adhesive. Optical axis 874 is a line generally through the centers of the optical components and is approximately perpendicular to the PDA unit as it exits optical reader assembly 800.

Reader assembly 800 incorporates an optical lens 880 fixed to lens mount 856 which is threaded into optical cavity 852. Aperture stop 885 is fixed to and supported by optical cavity 852. Optical image detector 890 is affixed to camera electronics 895 which abuts electronics mount 897 and is held in place by cap 896 threaded into the top of optical cavity 852. Optical lens 880 is positioned approximately mid-way between optical target 180 and optical detector 890 at about twice its focal distance from optical target 180 so that an image of optical target 180 is formed on the surface of optical detector 890 with approximately unit magnification. Aperture stop 885 serves to define the field of view and depth of field. Optical ray paths 875 trace light from optical target 180 to lens 880 to optical detector 890, thereby allowing optical target 180 to be imaged by optical detector 890. Optical lens 880 may incorporate an anti-reflection coating to reduce stray light reflections.

In the present embodiment the lens is made of glass or plastic substrate and assembled as a separate element. In another embodiment, the lens may be molded as a part of optical block 810. The equations for determining lens position relative to the object and detector are well known in the art.

Optical image detector 890 is a charge-coupled device (CCD) having approximately 500 by 500 pixels and lateral dimensions of one-half inch or less. The invention comprehends that other technology may be used to accomplish the optical to electronic conversion of the image—for example, a CMOS imaging device may be deployed in other embodiments. The camera may accomplish functions known in the art such as autofocus and zoom in conjunction with software resident on the host PDA. For example, the autofocus function will allow optical target 180 to be placed at different distances from the optical reader assembly. The resident software may also operate the integrated camera in a "black and white" mode whereby the color information is discarded, thereby creating further efficiencies in the scanning process.

Optical detector 890 is physically and electrically connected to camera electronics 895. Camera electronics 895 provides on-board memory, clocking, electrical buffering and computer interface functions. Camera electronics 895 is electronically connected to PDA unit 100 via cabling 892 which interconnects to the electrical connector 850 which mates with PDA electrical interface 150.

Optical reader assembly 800 may incorporate the use of other driver electronics (not shown) between PDA electrical interface 150, acquire button 820 or indicator LED 825 to accomplish electronic connection.

Figure 5:
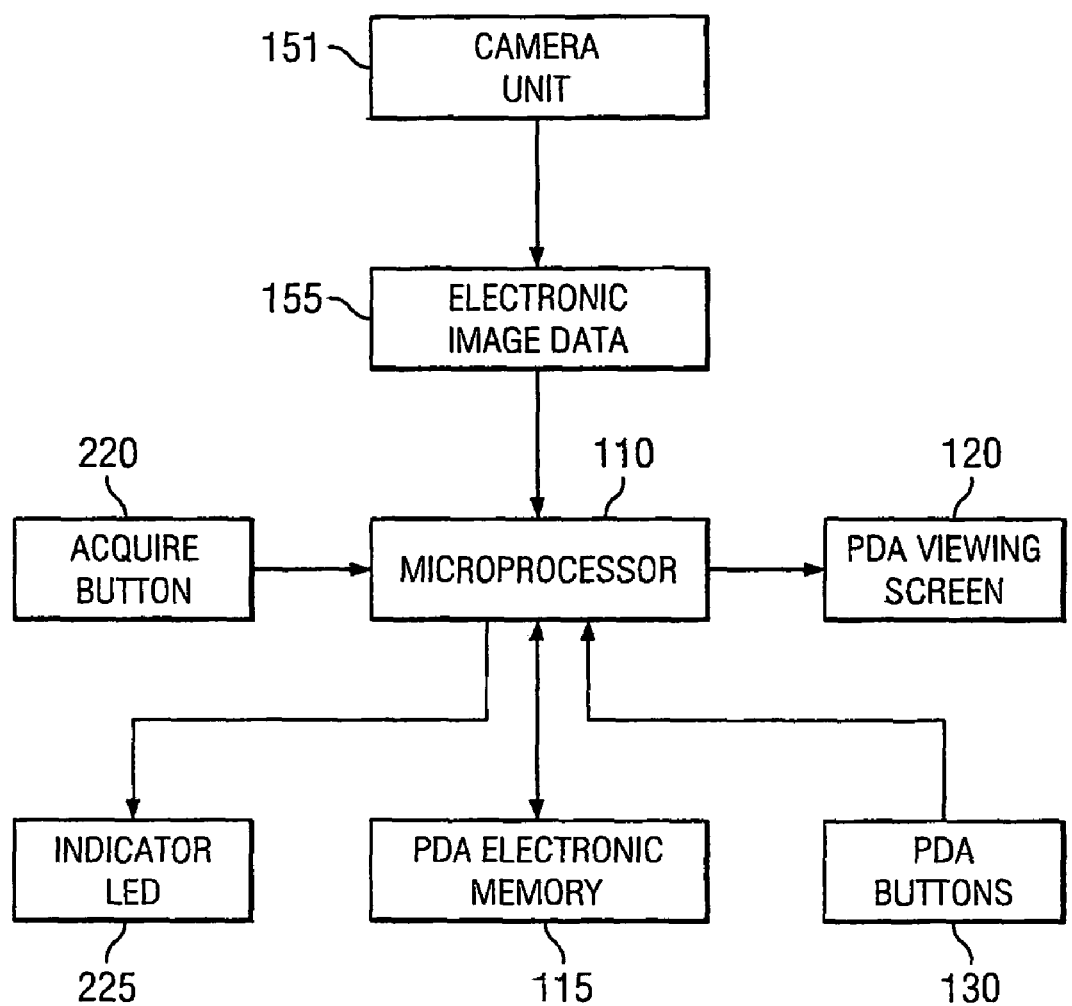
FIG. 5 is block diagram of the electronic architecture of the present invention.

The electronic architecture of the invention is shown in FIG. 5. PDA unit 100 includes a microprocessor 110 and electronic memory 115. Certain software programs may be stored in memory 115 and executed by microprocessor 110 to operate on PDA unit 100 to accomplish tasks that will be described. The type of microprocessor 110 and the storage capability of the electronic memory 115 are not critical to the invention except that they should be chosen to efficiently accomplish the tasks that will be described. For example, in another embodiment, microprocessor 110 may be composed of two processors, one processor dedicated to the user interface and normal functioning of the PDA; the other processor dedicated to image and OCR processing. Either or both processors could be a RISC class processor.

Microprocessor 110 accepts user stimulus electronically from the acquire button 220 and PDA buttons 130 to control the scanning process. As the optical target 180 is scanned, microprocessor 110 displays text characters 185 on PDA viewing screen 120. During the scan process, certain states and conditions of the process may be indicated by PDA viewing screen 120 or the indicator LED 225. In the alternate embodiments, the acquire buttons and indicator LEDs interact with the microprocessor in a similar way to the preferred embodiment.

To scan text, PDA camera unit 151 acquires an electronic image 155 of a character of text in optical target 180. The electronic image 155 is a bit-mapped pixilated representation of the optical image that exists on the surface of optical detector 290 and would typically contain 500 by 500 bytes i.e. 250 kbytes total. That image is stored momentarily in the on-board memory of camera unit 151 until the PDA microprocessor 110 extracts the electronic image 155 from the camera unit 151 and stores it in electronic memory 115.

Microprocessor 110 then acts on the electronic image 155 stored in memory 115 to convert the electronic image 155 into a byte or word digital character representation, such as the ASCII representation. The byte or word representing the digital character, which in turn represents the character of text in optical target 180 that was scanned, is then stored into an available location in memory 115. The portion of memory 115 that holds the electronic image 155 is then freed to be used for the next character in the scan.

Figure 6:
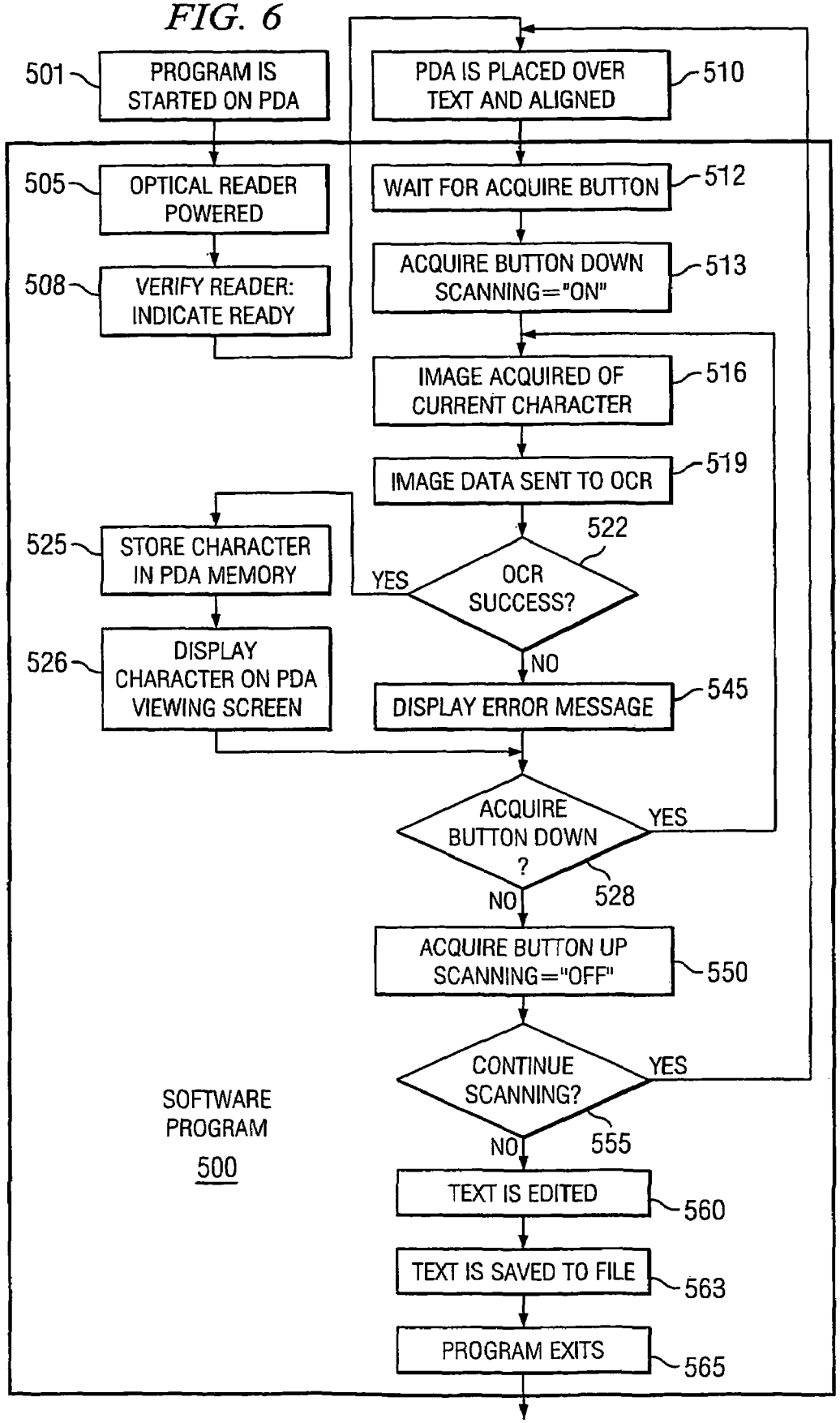
FIG. 6 is a flow diagram of the present invention.

FIG. 6 is a flow chart of a scan process that accomplishes the overall text scanning task. The process begins with step 501 when a text scanning application software program 500 residing in the electronic memory 115 of the PDA unit 100 is initiated. Once the program starts, it performs the step 505 of activating the acquire button 220 and camera unit 151, then step 508 of verifying the electronic integrity of the optical reader assembly 200 and lighting indicator 225, thereby signaling the operator that the PDA unit 100 is ready to scan text. Upon ready signal, step 510 is performed where the optical reader assembly 200 is placed over optical target 180 and aligned with alignment marks 231 and 232. After alignment the software program 500 waits to take further action until the acquire button is pressed in step 512. When acquire button 220 is pressed down, the software program 500 leaves step 512 and moves to step 513 in which it sets scanning state to "ON". In subsequent step 516, the electronic image data 155 is acquired from camera unit 151 and this image represents the current character situated in the optical path 275. Microprocessor 110 processes the electronic data 155 utilizing optical character recognition (OCR) software code in step 519. If the OCR process is successful, a valid byte or word digital character within the available character set will be selected and in step 522 the OCR process will return a valid character to the microprocessor 110 signaling that it was successful. If the OCR process is unable to match a valid character, it will return a flag to the microprocessor 110 indicating failure. OCR algorithms are well known in the art such that commercially available software code may be utilized to accomplish this task.

If OCR step 522 indicates success, then software program 500 proceeds to step 525 in which microprocessor 110 stores the character in memory 115 and on to step 526 in which the microprocessor 110 displays the character on the PDA viewing screen 120. Moving to step 528 then, the microprocessor 110 checks the state of the acquire button 220: if the button is still pressed down, then the software program 500 flows back to step 516 to repeat. If acquire button 220 is released, then the scanning state is changed to "OFF" in step 550 and the operator is queried in step 555 to scan again or to stop. If the operator selects to continue scanning, the scanning process is repeated beginning with step 510. If the operator selects to stop scanning then the process moves to step 560. In step 560 and subsequent steps 563 and 565, the scanned and processed text is edited if the operator chooses to, is saved to a text file and the program exits, respectively.

If OCR step 522 indicates failure, then the scan process proceeds immediately to step 545 in which the microprocessor 110 displays an error condition on the PDA viewing screen 120 indicating to the operator that the last character was not valid and that the operator must rescan. The software program proceeds to check that the acquire button is still depressed in step 528. If the button is depressed, then the device acquires a new image and the conversion process repeats. If the acquire button is released, the scanning state is switched to "OFF" in step 550 and the scan process moves to step 555 to query the user to continue scanning or not. The software program 500 proceeds as described before from that point. In other embodiments of the present invention, the PDA may signal the operator with the indicator LED 225 or with audio sounds instead of or in concert with the visual signals on the PDA viewing screen.

In another embodiment of the invention, the scan process is altered by inserting a step between step 516 and step 519. The new software step deconvolves and transforms the electronic image data 155 using the known transfer function for the optical components so as to remove the distortion effects of optical aberrations.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A PDA scanner comprising:
 a housing means, attached to a PDA, for visually targeting a subject to be scanned;
 a camera means, contained within the housing means, for electrically capturing an image of the subject to be scanned wherein the camera means comprises a camera and an image control means, in an optical path between the subject to be scanned and the camera; a light directing channel contained within the housing means between the camera means and the subject to be scanned, the light directing channel comprising an optical fiber.

2. The PDA scanner of claim 1 wherein the camera means further comprises an illumination means for illuminating the subject to be scanned.

3. The PDA scanner of claim 2 wherein the illuminating means produces visible light.

4. The PDA scanner of claim 2 wherein the illumination means produces light with a spectrum to match the peak sensitivity of the camera means.

5. The PDA scanner of claim 1 including a scan indicator light electronically connected to the PDA.

6. The PDA scanner of claim 1 wherein the camera means includes an electronic image capture device.

7. The PDA scanner of claim 6 wherein the electronic image capture device is a charge-coupled device camera.

8. The PDA scanner of claim 1 wherein the camera means is electronically connected to the PDA.

9. The PDA scanner of claim 1 wherein the PDA further comprises a microprocessor electronically coupled to the camera means and a display electronically coupled to the microprocessor, the microprocessor programmed to carry out the steps of:
   accessing the camera means;
   recording an image of the subject to be scanned; and
   displaying the image of the subject to be scanned.

10. The PDA scanner of claim 9 wherein the microprocessor is further programmed to carry out the step of recognizing the subject to be scanned.

11. The PDA scanner of claim 1 wherein the housing means further comprises a transparent window area adjacent the subject to be scanned.

12. The PDA scanner of claim 1 wherein the housing means is formed of a transparent plastic.

13. The PDA scanner of claim 1 wherein the housing means includes a scan alignment means, inset in the housing means, for aiming the camera means at the subject to be scanned.

14. The PDA scanner of claim 1 wherein the camera means includes a memory for storing an image.

15. The PDA scanner of claim 1 wherein the housing means includes a cradle removably attached to the PDA.

16. A scanner for attachment to a PDA having a camera comprising:
   a housing means, adjacent the PDA, for visually targeting a subject to be scanned; and
   an optical channel, adjacent the camera, for directing light from the subject to be scanned to the camera;
   wherein the optical channel includes a reflecting element and a refracting element between the camera and the subject to be scanned; and,
   a light source passing light energy through the reflective element and onto the subject to be scanned.

17. The scanner of claim 16 wherein the optical channel includes an aperture stop.

18. The scanner of claim 16 further comprising a light source to illuminate the subject to be scanned.

19. The scanner of claim 16 including a light source reflected by the reflective element and incident on the subject to be scanned.

20. The scanner of claim 16 wherein the housing means further includes an optical passage in between the camera and the subject to be scanned.

21. The scanner of claim 16 wherein the housing means is transparent.

22. The scanner of claim 16 wherein the housing means contains a window for sighting the subject to be scanned.

23. The scanner of claim 16 wherein the housing means is removably attached to the PDA.

24. The scanner of claim 16 wherein the PDA includes a microprocessor connected to the camera, the microprocessor programmed to carry out the steps of:
   accessing the camera; and
   recording an image of the subject to be scanned.

25. The scanner of claim 24 wherein the PDA further includes a display screen connected to the microprocessor, the microprocessor programmed to carry out the further step of:
   displaying the image of the subject to be scanned on the display.

26. The scanner of claim 24 wherein the housing means further includes an indicator light, connected to the microprocessor and the microprocessor is further programmed to carry out the step of:
   activating the indicator light upon a successful scan of the subject.

27. The scanner of claim 24 wherein the microprocessor is further programmed to carry out the steps of:
   analyzing the image of the subject to be scanned; and
   translating the image into a secondary electronic form.

28. The scanner of claim 27 wherein the secondary electronic form is a character.

29. The scanner of claim 27 wherein the step of translating is accomplished by optical character recognition.

* * * * *